United States Patent
Liu et al.

(10) Patent No.: US 6,667,988 B1
(45) Date of Patent: *Dec. 23, 2003

(54) SYSTEM AND METHOD FOR MULTI-LEVEL CONTEXT SWITCHING IN AN ELECTRONIC NETWORK

(75) Inventors: Jung-Jen Liu, San Jose, CA (US); Scott Smyers, San Jose, CA (US); Bruce A. Fairman, Woodside, CA (US); Steve Pham, Milpitas, CA (US); Jose L. Diaz, San Jose, CA (US); Richard A. Bardini, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 47 days.

This patent is subject to a terminal disclaimer.

(21) Appl. No.: 09/638,659

(22) Filed: Aug. 14, 2000

Related U.S. Application Data

(63) Continuation of application No. 09/336,064, filed on Jun. 18, 1999.

(51) Int. Cl.[7] .............................................. H04L 12/66
(52) U.S. Cl. ...................... 370/463; 709/250; 709/253; 710/100
(58) Field of Search ................................. 370/462, 475, 370/522, 463; 709/223, 225, 238, 240, 243, 244, 249, 250, 102, 103, 107, 108, 245, 253; 710/100, 113, 115, 129

(56) References Cited

U.S. PATENT DOCUMENTS

| | | | | |
|---|---|---|---|---|
| 4,498,136 A | * | 2/1985 | Sproul, III .................. 709/228 |
| 5,659,749 A | * | 8/1997 | Mitchell et al. ............. 709/228 |
| 5,983,301 A | * | 11/1999 | Baker et al. ................. 710/113 |
| 6,169,745 B1 | * | 1/2001 | Liu et al. ..................... 370/463 |
| 6,243,804 B1 | * | 6/2001 | Cheng ......................... 712/228 |
| 6,412,029 B1 | * | 6/2002 | Mecklai et al. ............... 710/22 |

* cited by examiner

Primary Examiner—Dang Ton
Assistant Examiner—Phuc Tran
(74) Attorney, Agent, or Firm—Gregory J. Koerner; Simon & Koerner LLP

(57) ABSTRACT

A system and method for multi-level context switching in an electronic network comprises a control state machine configured to implement a data priority scheme, a return address generator configured to hold and release return addresses for interrupted instruction modules in accordance with the data priority scheme and context information from the electronic network, and a processor configured to process data from the electronic network in accordance with the data priority scheme and the context information. Receive registers stores data received from the electronic network. The control state machine includes a switch address generator and a program counter select. The switch address generator outputs a switch address, which is an address for a first instruction for a selected-context instruction module. The return address generator holds and releases the return addresses, which are addresses of next consecutive instructions, when an instruction module is interrupted for a context switch. The program counter select outputs a switch address, a return address, or a next consecutive address to select the appropriate instruction in the memory for execution by the processor.

49 Claims, 10 Drawing Sheets

SYSTEM AND METHOD FOR MULTI-LEVEL CONTEXT SWITCHING IN AN ELECTRONIC NETWORK

CROSS-REFERENCE TO RELATED APPLICATIONS

This application is a continuation of co-pending U.S. application Ser. No. 09/336,064, entitled "System And Method For Multi-Level Context Switching In An Electronic Network," filed on Jun. 18, 1999. This application is also related to co-pending U.S. application Ser. No. 09/322,632, entitled "System And Method For Context Switching In An Electronic Network," filed on May 28, 1999, and to co-pending U.S. application Ser. No. 09/363,086, entitled "System And Method For Fast Data Transfers In An Electronic Network," filed on Jul. 28, 1999. The related applications are commonly assigned, and are hereby incorporated by reference.

BACKGROUND OF THE INVENTION

1. Field of the Invention

This invention relates generally to electronic networks, and more particularly to a system and method for multi-level context switching in an electronic network.

2. Description of the Background Art

Utilizing an effective method for managing communications between electronic devices within an electronic network is a significant consideration of designers, manufacturers, and users of electronic devices. An electronic device in an electronic network may advantageously communicate with other electronic devices in the network to share data and substantially increase the resources available to each device in the network. For example, an electronic network may be installed in a user's home to enable flexible and beneficial sharing of resources between various consumer electronic devices, such as personal computers, digital video disc (DVD) devices, digital set-top boxes for digital broadcasting, television sets, and audio playback systems.

An electronic device in an electronic network may alternately receive or transmit data across the network. Therefore, an electronic device may be required to function both as a transmitter and as a receiver of data. In such a case, the electronic device may be required to switch between a transmit mode and a receive mode, that is, to switch contexts. Context switching is especially important in electronic networks where each device in the network has a combined input/output interface with the network. Since data may be transmitted and received via the same interface, such a device may not transmit data and receive data at the same time. Therefore, a device may need to switch contexts to effectively communicate with other devices in the network.

In some types of electronic networks, electronic devices may be "daisy-chained" so that devices are directly connected to one another in a tree-like structure instead of being connected to a common network bus structure. In such a network, data being delivered via the bus may pass through various intermediary devices before arriving at the destination device. An intermediary device, in a receive context, may receive data and then switch to a transmit context to transmit the data to another device. Alternately, an intermediary device may transmit data to a destination device in a transmit context, and then switch to a receive context to function as a destination device for different data.

In some electronic networks, when a device is currently preparing to transmit data on the bus, the device typically is not able to receive data at the same time. However, if the device does not receive the data intended for it, that data may be lost. Loss of data may especially be a problem in a situation where the source of the data is a broadcast signal that cannot be repeated if the data is not received. Further, when a device is currently processing received data, the device typically is not able to receive other data, which may also result in loss of data. Therefore, efficient and flexible context switching is needed to prevent loss of data being sent across the network.

Context switching in an electronic network should be as efficient and flexible as possible to maintain effective communications across the network. Therefore, managing communications between electronic devices in an electronic network remains a significant consideration for designers, manufacturers, and users of electronic devices.

SUMMARY OF THE INVENTION

In accordance with the present invention, a system and method are disclosed for implementing multi-level context switching in an electronic network. In one embodiment, the invention includes a control state machine configured to implement a data priority scheme, a processor configured to process data from the electronic network in accordance with the data priority scheme and context information from the electronic network, and a return address generator. The return address generator is configured to hold and release return addresses for interrupted instruction modules in accordance with the data priority scheme and the context information.

The invention also includes receive registers that store data received from the electronic network. The control state machine selects data from one of the receive registers for processing according to the data priority scheme and the context information from the electronic network.

The invention also includes a memory coupled to the control state machine, which stores instruction modules for execution by the processor. Each of the instruction modules corresponds to a context. The memory preferably stores a cycle start instruction module, a transmit instruction module, and a receive instruction module for each data channel supported by the electronic network. The control state machine selects one of the instruction modules for execution by the processor in response to context information contained in data packet headers received from the electronic network and in accordance with the data priority scheme.

The control state machine includes a switch address generator and a program counter select. The switch address generator outputs a switch address, which is an address for a first instruction for a selected-context instruction module. The return address generator holds and releases the return addresses, which are addresses of next consecutive instructions, when an instruction module is interrupted for a context switch. The program counter select outputs a switch address, a return address, or a next consecutive address to select the appropriate instruction in the memory for execution by the processor.

Execution of an instruction module may be interrupted when a context switch occurs. The return address generator holds and releases return addresses so that interrupted instruction modules may be resumed at the point where each interruption occurred. A transmit operation may be interrupted for a receive operation or a cycle start operation. A receive operation may be interrupted by another receive operation if the incoming data has a higher priority according to the data priority scheme. The data priority scheme includes priority criteria determined by processing requirements of received data. The priority criteria may include signal speed, length, and decryption requirements of the received data. The present invention thus efficiently and effectively implements a system and method for multi-level context switching in an electronic network.

DETAILED DESCRIPTION OF THE PREFERRED EMBODIMENT

The present invention relates to an improvement in electronic networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes a control state machine configured to implement a data priority scheme, a return address generator configured to hold and release return addresses for interrupted instruction modules in accordance with the data priority scheme and context information from the electronic network, and a processor configured to process data from the electronic network in accordance with the data priority scheme and the context information. The invention also includes receive registers that store received data from the electronic network. The control state machine includes a switch address generator and a program counter select. The switch address generator outputs a switch address, which is an address for a first instruction for a selected-context instruction module. The return address generator holds and releases the return addresses, which are addresses of next consecutive instructions, when an instruction module is interrupted for a context switch. The program counter select outputs a switch address, a return address, or a next consecutive address to select the appropriate instruction in the memory for execution by the processor.

Figure 1:
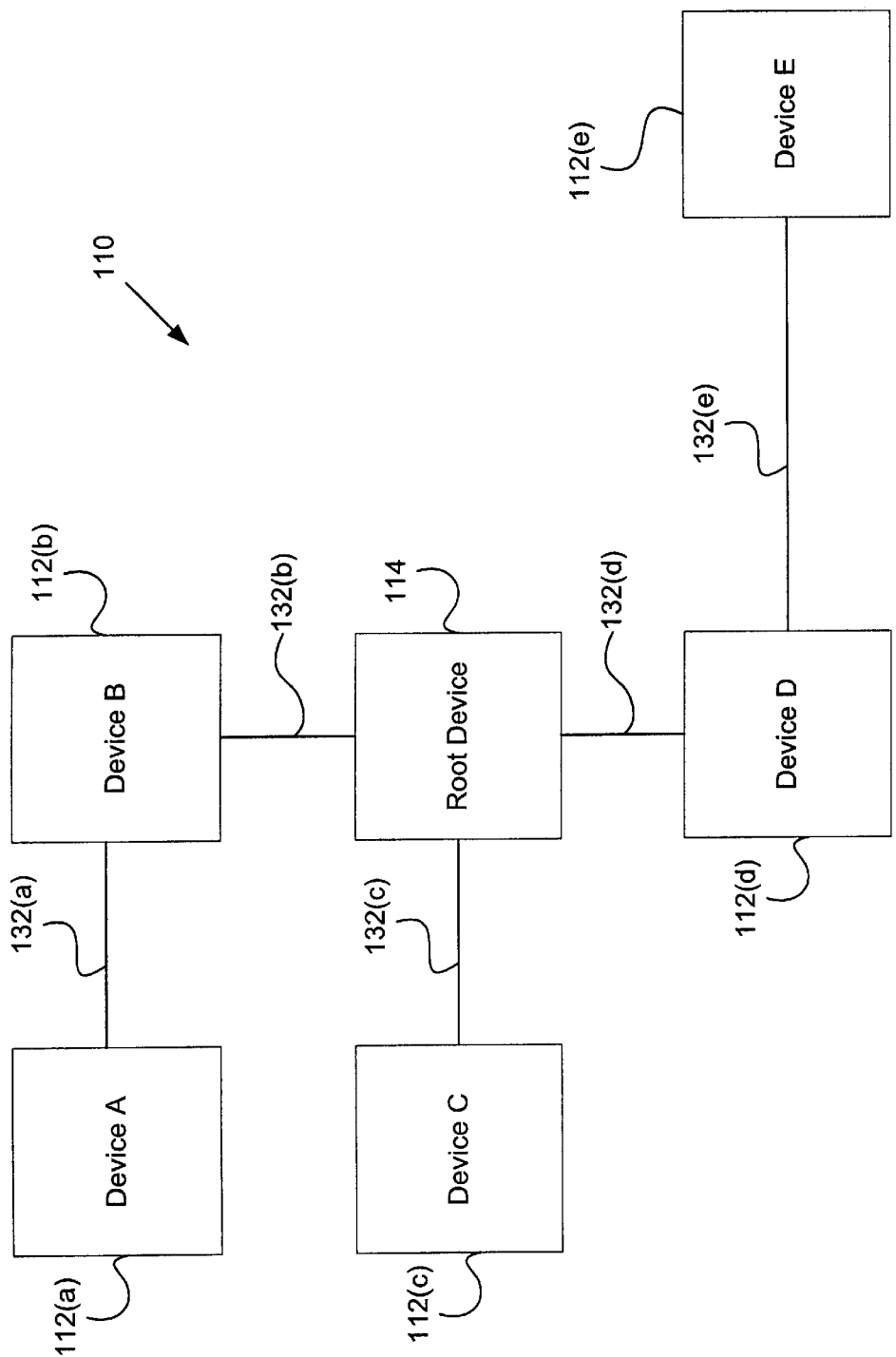
FIG. 1 is a block diagram for one embodiment of an electronic network, according to the present invention.

Referring now to FIG. 1, a block diagram for one embodiment of an electronic network 110 is shown, according to the present invention. The electronic network includes, but is not limited to, a device A 112(a), a device B 112(b), a root device 114, a device C 112(c), a device D 112(d), and a device E 112(e). Various other embodiments of electronic network 110 may contain a greater or lesser number of devices, which may be connected in numerous different configurations. Device A 112(a), device B 112(b), root device 114, device C 112(c), device D 112(d), and device E 112(e) may be implemented as any type of electronic device, including, but not limited to, personal computers, printers, digital video disc devices, television sets, audio systems, video cassette recorders, and set-top boxes for digital broadcasting.

The devices in electronic network 110 preferably communicate with one another using a bus. The bus includes cable 132(a), cable 132(b), cable 132(c), cable 132(d), and cable 132(e). Device B 112(b) is coupled to device A 112(a) with cable 132(a), and to root device 114 with cable 132(b). Root device 114 is coupled to device C 112(c) with cable 132(c) and to device D 112(d) with cable 132(d). Device D 112(d) is coupled to device E 112(e) with cable 132(e). In the FIG. 1 embodiment, cables 132(a) through 132(e) preferably implement the 1394-1995 IEEE Standard for a High Performance Serial Bus, which is hereby incorporated by reference. However, other network connectivity standards are within the scope of the present invention.

Each device in electronic network 110 may communicate with any other device in the network. For example, device E 112(e) may communicate with device B 112(b) by transmitting data via cable 132(e) to device D 112(d), which then transmits the data via cable 132(d) to root device 114. Root device 114 then transmits the data to device B 112(b) via cable 132(b). In the FIG. 1 embodiment, root device 114 provides a master clock signal to synchronize operations for all of the devices in network 110. In other embodiments of network 110, any one of the network devices may be designated as the root device, or cycle master.

Figure 2:
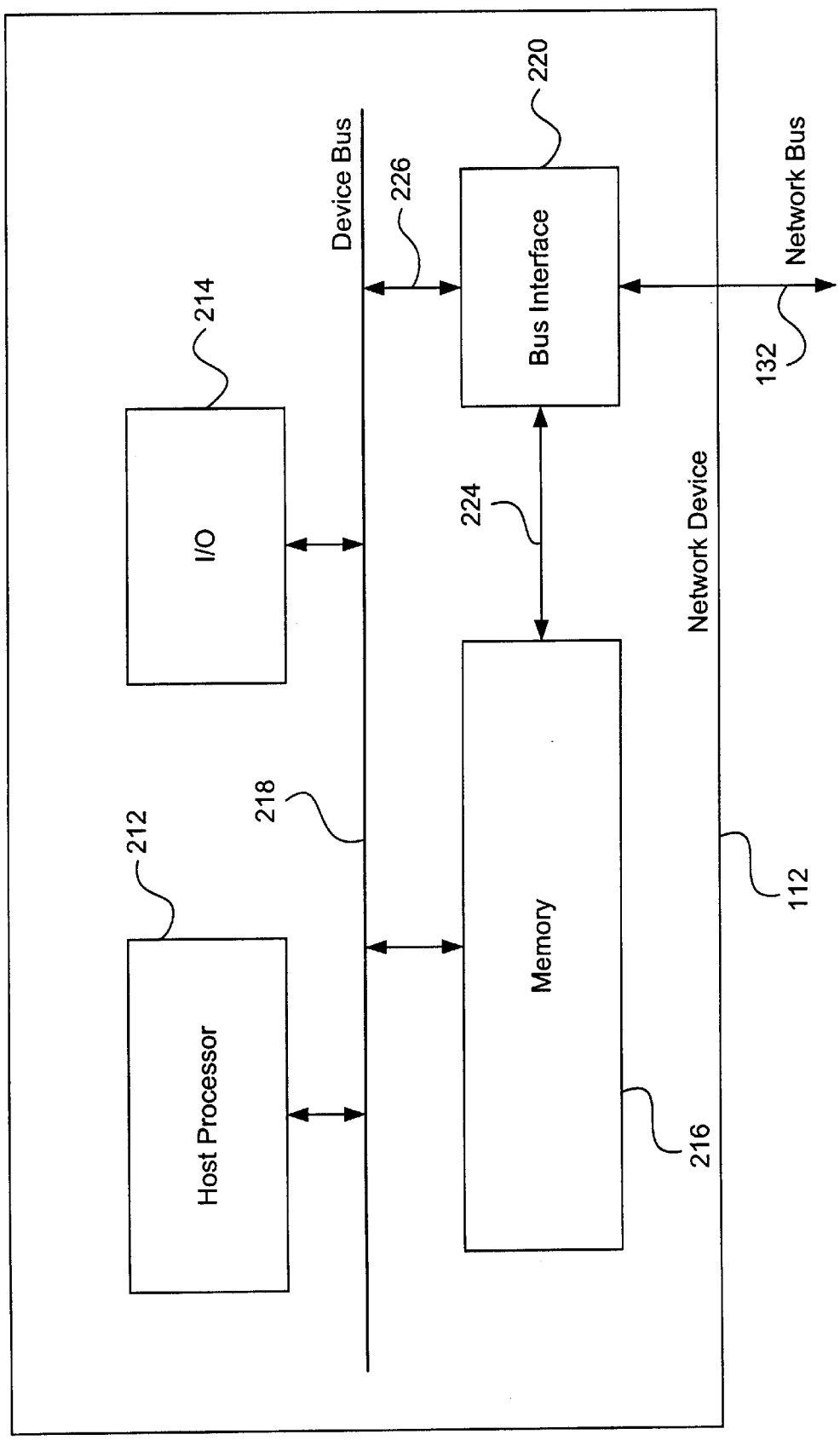
FIG. 2 is a block diagram for one embodiment of an exemplary network device from FIG. 1, according to the present invention.

Referring now to FIG. 2, a block diagram for one embodiment of an exemplary network device 112 in network 110 is shown, according to the present invention. Device 112 preferably includes, but is not limited to, a host processor 212, an input/output (I/O) interface 214, a memory 216, a device bus 218, and a bus interface 220. Host processor 212, I/O interface 214, memory 216 and bus interface 220 preferably communicate via device bus 218.

Host processor 212 may be implemented as any appropriate multipurpose microprocessor device. Memory 216 may be implemented as any combination of storage devices, including, but not limited to, read-only memory, random-access memory, and various types of non-volatile memory, such as floppy discs or hard discs. I/O interface 214 may provide an interface to a network other than network 110, for example the Internet. Bus interface 220 provides an interface between device 112 and network 110, and communicates with network 110 via cable 132. Bus interface 220 communicates with host processor 212, I/O device 214, and memory 216 via a path 226 and device bus 218. Bus interface 220 may also directly communicate with memory 216 via a path 224.

Figure 3:
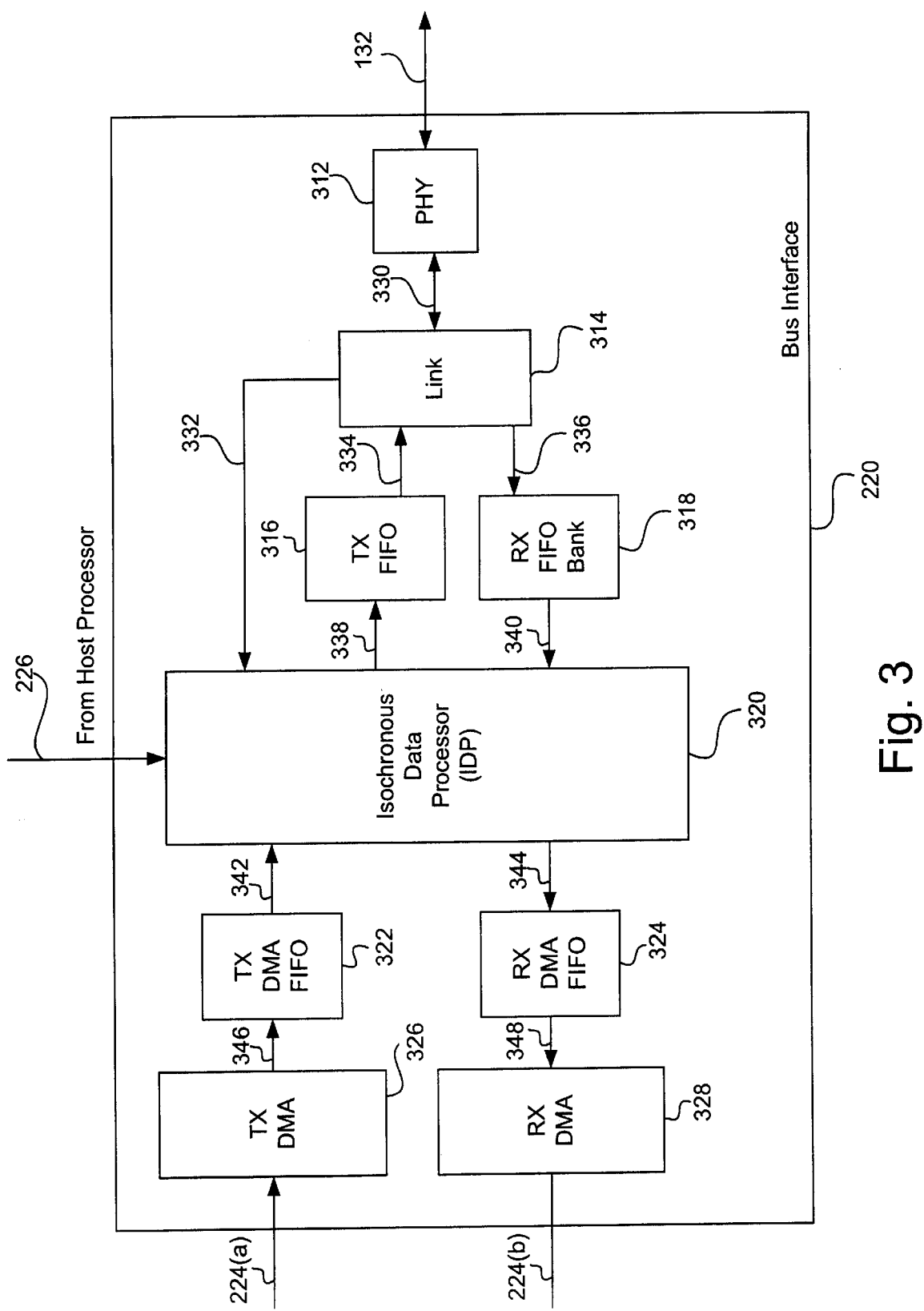
FIG. 3 is a block diagram for one embodiment of the bus interface of FIG. 2, according to the present invention.

Referring now to FIG. 3, a block diagram for one embodiment of the bus interface 220 of FIG. 2 is shown, according to the present invention. Bus interface 220 includes, but is not limited to, a physical layer (PHY) 312, a link layer (link) 314, a transmit first-in-first-out register (TX FIFO) 316, a receive first-in-first-out register bank (RX FIFO bank) 318, an isochronous data processor (IDP) 320, a transmit direct-memory-access FIFO (TX DMA FIFO) 322, a receive direct-memory-access FIFO (RX DMA FIFO) 324, a transmit direct-memory-access (TX DMA) 326, and a receive direct-memory-access (RX DMA) 328. Bus interface 220 typically also includes an asynchronous data processor (not shown) that manages traditional asynchronous data transfer operations.

Isochronous data transfers are typically used for time-sensitive applications. For example, video or audio data being transmitted across a network to a computer, television or other display device needs to arrive at the display device in an uninterrupted flow with appropriate timing. Isochronous data transfers allow data to be delivered as fast as it is displayed and allows synchronization of audio and video data. For example, an analog voice signal may be digitized at a rate of one byte every 125 microseconds. It is necessary to deliver this voice data at a rate of one byte every 125 microseconds for the display device to correctly reconstruct the analog voice signal.

In an IEEE 1394 serial bus network each bus cycle is typically 125 microseconds and is determined by a cycle master. The cycle master generates a cycle start packet every 125 microseconds to synchronize the clocks of all devices on network 110. An isochronous data transfer is performed over a number of bus cycles, with an isochronous process associated with each bus cycle of the isochronous data transfer.

An isochronous process is guaranteed to have processor time and other system resources necessary for its execution during a particular bus cycle, so that isochronous processes have time to complete execution in each bus cycle. Any time in a bus cycle not used for isochronous processes is typically used for asynchronous processes, which execute independently of one another. The scheduling of isochronous processes is deterministic and has bounded latency. In other words, it is known when the isochronous processes will occur and each isochronous process will occur during a given amount of time.

In the FIG. 3 embodiment of bus interface 220, when device 112 is receiving data on bus 132, then PHY 312 preferably transforms incoming bit stream data into bytes of data before passing the data to link 314 via path 330. Link 314 preferably decodes header information from incoming data packets and allocates the incoming data and the various pieces of header information to the appropriate destination. Header information indicates processing requirements of the corresponding data packets, and may typically include channel number, data type (for example, asynchronous or isochronous), and signal speed. Link 314 also preferably encodes header information for outgoing data packets in the format required by bus 132.

In network 110, a bus cycle preferably begins with a cycle start packet. The cycle start packet informs all of the devices on network 110 that data will be arriving on bus 132 from one or more of the devices and synchronizes the device clocks. Link 314 allocates the cycle start packet to IDP 320 via path 332. Link 314 allocates other data packets received by device 112 to RX FIFO bank 318 via path 336. RX FIFO bank 318 preferably temporarily stores the received data before sending the data to IDP 320 via path 340. The contents and functionality of RX FIFO bank 318 is further described below in conjunction with FIG. 4.

IDP 320 sends the received data to RX DMA FIFO 324 via path 344. The functionality of IDP 320 for received data is further discussed below in conjunction with FIG. 5. RX DMA FIFO 324 preferably temporarily stores the received data before sending the received data to RX DMA 328 via path 348. RX DMA 328 then preferably allocates the received data to memory 216 (FIG. 2) via path 224(b).

When device 112 transmits data on bus 132, TX DMA 326 preferably fetches the data from memory 216 via path 224(a) and sends the data to TX DMA FIFO 322 via path 346. TX DMA FIFO 322 preferably temporarily stores the data before sending the data to IDP 320 via path 342. The functionality of IDP 320 for transmitted data is further discussed below in conjunction with FIG. 5. IDP 320 then sends the data to TX FIFO 316 via path 338. TX FIFO 316 preferably temporarily stores the data before sending the data to link 314 via path 334. Link 314 next generates outgoing data packets with appropriate header information and sends the packets to PHY 312. PHY 312 then translates the bytes of the outgoing data packets into an outgoing bit stream for transmission over bus 132.

Figure 4:
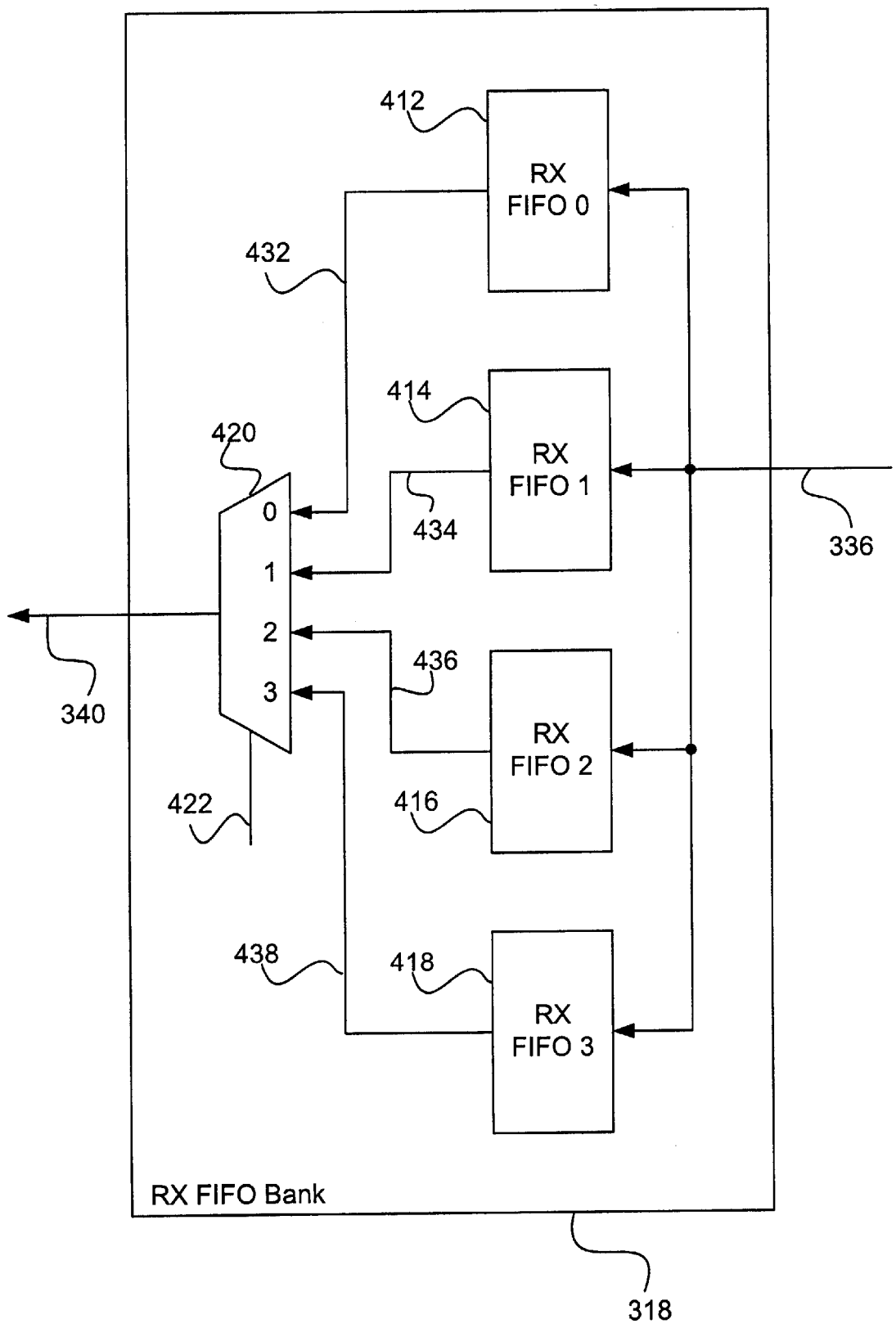
FIG. 4 is a block diagram for one embodiment of the receive first-in-first-out register bank (RX FIFO bank) of FIG. 3, according to the present invention.

Referring now to FIG. 4, a block diagram for one embodiment of the RX FIFO bank 318 of FIG. 3 is shown, according to the present invention. RX FIFO bank 318 includes, but is not limited to, an RX FIFO 0 412, an RX FIFO 1 414, an RX FIFO 2 416, an RX FIFO 3 418, and a multiplexer 420. The FIG. 4 embodiment of RX FIFO bank 318 includes four RX FIFOs; however, RX FIFO bank 318 may contain any number of FIFOs.

Incoming data from link 314 arrives at RX FIFO bank 318 via path 336. The incoming data is stored in one of the RX FIFOs. Link 314 allocates sets of incoming data to the RX FIFOs sequentially, beginning with RX FIFO 0 412. Data from different channels are preferably allocated to separate RX FIFOs. Different types of data are assigned to different channels for distribution. For example, video data may be assigned to channel 1, and audio data may be assigned to channel 7.

Data output from each RX FIFO in RX FIFO bank 318 is input to multiplexer 420. A signal from IDP 320 via path 422 selects the data output from RX FIFO bank 318 via path 340. If input 0 of multiplexer 420 is selected, data from RX FIFO 0 412 via path 432 is output to IDP 320. If input 1 of multiplexer 420 is selected, data from RX FIFO 1 414 via path 434 is output to IDP 320. If input 2 of multiplexer 420 is selected, data from RX FIFO 2 416 via path 436 is output to IDP 320. If input 3 of multiplexer 420 is selected, data from RX FIFO 3 418 via path 438 is output to IDP 320. Although link 314 preferably allocates data to the RX FIFOs sequentially, the four inputs of multiplexer 420, and therefore the data in the RX FIFOs, may be advantageously selected in any order as determined by IDP 320. The flexible selection of data output from RX FIFO bank 318 is further discussed below in conjunction with FIG. 6.

Figure 5:
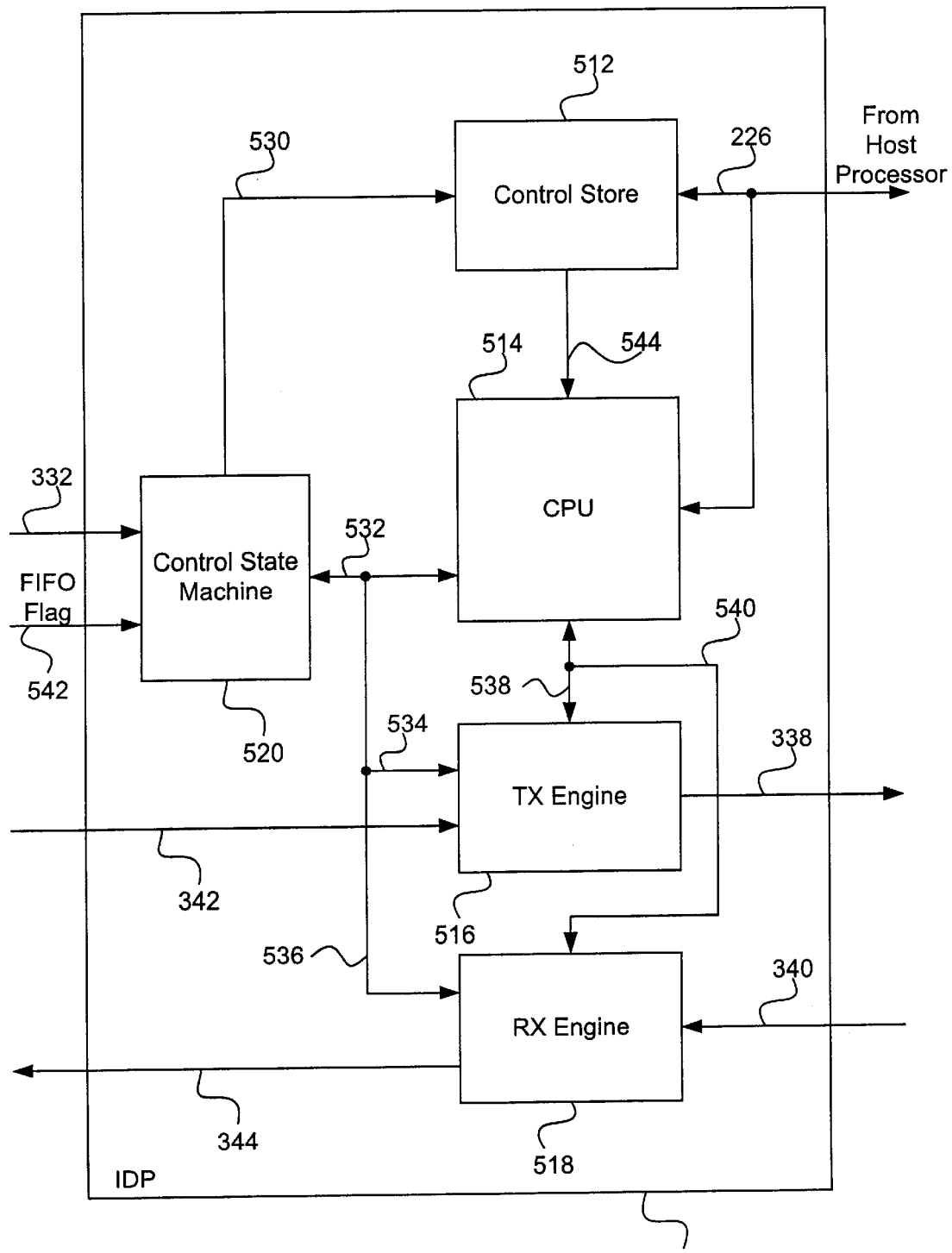
FIG. 5 is a block diagram for one embodiment of the isochronous data processor (IDP) of FIG. 3, according to the present invention.

Referring now to FIG. 5, a block diagram for one embodiment of the isochronous data processor (IDP) 320 of FIG. 3 is shown, according to the present invention. IDP 320 includes, but is not limited to, a control store 512, a central processing unit (CPU) 514, a transmit (TX) engine 516, a receive (RX) engine 518, and a control state machine 520.

In the FIG. 5 embodiment, control store 512 is a memory that preferably contains various instructions that are output via path 544 to CPU 514 for execution. The instructions are preferably loaded into control store 512 by host processor 212 (FIG. 2) via path 226. Host processor 212 also preferably loads information into a register file inside CPU 514 via path 226. Further, host processor 212 may also read back the contents of control store 512 and the register file inside CPU 514. The contents and functionality of control store 512 are further described below in conjunction with FIG. 6.

CPU 514 performs various operations on incoming and outgoing data according to the instructions from control store 512. CPU 514 operates on outgoing data in conjunction with TX engine 516, and operates on incoming data in conjunction with RX engine 518. CPU 514 also processes information in the cycle start packets provided by link 314.

Control state machine 520 receives various signals from link 314 (FIG. 3) via path 332. The signals from link 314 typically include the context of data packets on bus 132, signal speed, decryption requirements, and a channel number for received data packets. Control state machine 520 also receives a FIFO flag 542 that indicates whether TX FIFO 316, RX FIFO 318, TX DMA FIFO 322 and RX DMA FIFO 324 are full or able to receive data. Control state machine 520 also receives control signals from CPU 514 via path 532. Control state machine 520 utilizes these various signals to responsively select appropriate instructions in control store 512 for execution by CPU 514.

When device 112 is required to switch contexts, control state machine 520 selects an appropriate instruction module in control store 512. For example, when device 112 is transmitting data over bus 132, control state machine 520 selects a transmit instruction module in control store 512 for execution by CPU 514. When device 112 is receiving data from bus 132, control state machine 520 selects a receive instruction module in control store 512 for execution by CPU 514. The functionality of control state machine 520 is further described below in conjunction with FIG. 6.

Figure 6:
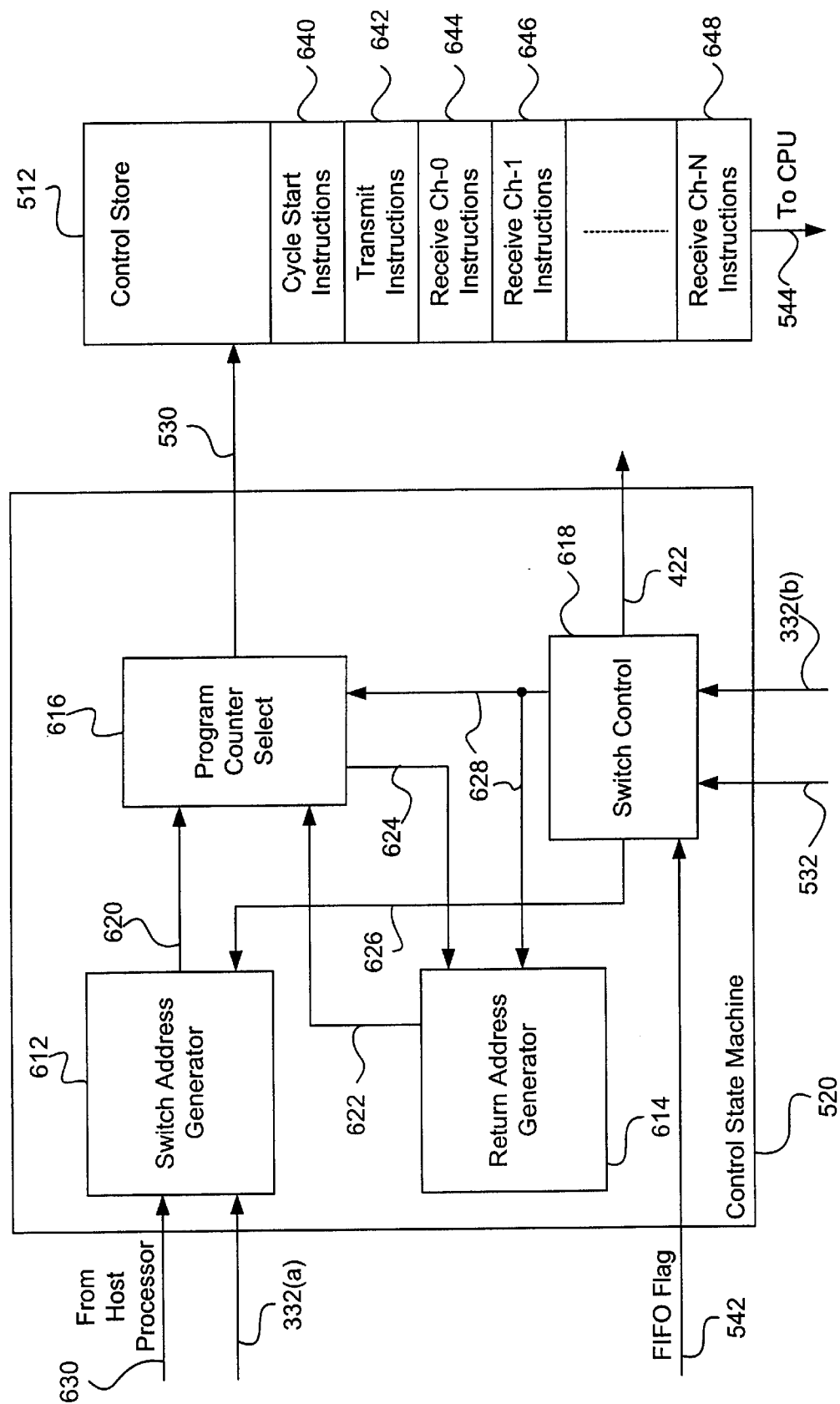
FIG. 6 is a block diagram for one embodiment of the control state machine and the control store of FIG. 5, according to the present invention.

Referring now to FIG. 6, a block diagram for one embodiment of the control state machine 520 and the control store 512 of FIG. 5 is shown, according to the present invention. Control state machine 520 includes, but is not limited to, a switch address generator 612, a return address generator 614, a program counter select 616, and a switch control 618. Control store 512 includes cycle start instructions 640, transmit instructions 642, and various receive instruction modules, each corresponding to a unique data channel, including receive channel 0 (Ch-0) instructions 644 through receive channel N (Ch-N) instructions 648. An IEEE 1394 serial bus network may support up to sixty-four data channels; however, a network utilizing any number of data channels is within the scope of the present invention. Control store 512 may also include other instructions for execution by CPU 514.

When device 112 receives a cycle start packet on bus 132, switch control 618 sends a control signal to switch address generator 612 via path 626. Switch address generator 612 responsively generates the appropriate address for the first instruction of cycle start instructions 640, which becomes the switch address. Switch address generator 612 outputs the switch address to program counter select 616 via path 620. Switch control 618 sends a control signal to program counter select 616 via path 628 to select the switch address, which is then output to control store 512 via path 530. Control store 512 responsively sends the first instruction of cycle start instructions 640 to CPU 514 via path 544. Switch control 618 then sends a control signal to program counter select 616 whereby program counter select 616 outputs consecutive addresses to control store 512 so that consecutive cycle start instructions 640 are output to CPU 514 for execution.

When device 112 transmits data to network 110 via bus 132, switch control 618 first receives a start signal from CPU 514 via path 532. Switch control 618 then preferably checks FIFO flag 542 to ascertain whether TX DMA FIFO 322 (FIG. 3) is not empty. If TX DMA FIFO 322 is not empty, switch control 618 sends a control signal to switch address generator 612, which responsively generates the appropriate address for the first instruction of transmit instructions 642, which becomes the switch address. Switch control 618 then sends a control signal to program counter select 616 to select the switch address. Control store 512 then sends the first instruction of transmit instructions 642 to CPU 514, which begins transmitting the data in TX DMA FIFO 322 in conjunction with TX engine 516. Switch control 618 next sends a control signal to program counter select 616 so that program counter select 616 outputs consecutive addresses for transmit instructions 642.

While device 112 is transmitting data, another device in network 110 may begin sending data to device 112. If device 112 does not switch contexts to a receive context and begin receiving data, then that data may be lost. Thus device 112 will preferably interrupt the transmission process and begin receiving the incoming data. After receiving the incoming data, device 112 will advantageously resume transmission where the foregoing transmission process was interrupted.

To allow device 112 to resume transmission of data, return address generator 614 preferably holds the address of the next consecutive transmit instruction 642. Program counter select 616 outputs the address for the next consecutive transmit instruction 642 on path 624. Switch control 618 sends a control signal to return address generator 614, whereby return address generator 614 holds the address for the next transmit instruction 642. The address of the next consecutive transmit instruction 642 thus becomes the transmit (TX) return address. The functionality of return address generator 614 is further described below in conjunction with FIG. 8.

In response to information from link 314 via path 332(a) and a control signal from switch control 618 via path 626, switch address generator 612 outputs the address for the first instruction of the appropriate receive instruction module, for example receive Ch-1 instructions 646. Link 314 also informs switch control 618, via path 332(b), where in RX FIFO bank 318 (FIG. 4) the received data is stored, for example in RX FIFO 0 412. Switch control 618 sends a control signal to program counter select 616 to select the switch address as the output to control store 512, and sends a signal to multiplexer 420 (FIG. 4) via path 422 to select the data in RX FIFO 0 412 to be output to IDP 320. Control store 512 responsively sends the first instruction of receive Ch-1 instructions 646 to CPU 514 for execution. Switch control 618 then sends a control signal to program counter select 616 whereby consecutive addresses of receive Ch-1 instructions 646 are output to control store 512.

When CPU 514 has completed the execution of receive Ch-1 instructions 646, device 112 preferably resumes transmission of data. Switch control 618 sends a control signal to return address generator 614 to release the TX return address to program counter select 616 via path 622. Switch control 618 then sends a control signal to program counter select 616 to select the return address as the output to control store 512. Program counter select 616 outputs the return address to control store 512, which sends the appropriate transmit instruction 642 to CPU 514 to resume transmission of data. Switch control 618 next sends a control signal to program counter select 616 so that program counter select 616 outputs consecutive addresses for the remaining transmit instructions 642.

While CPU 514 is executing receive Ch-1 instructions 646 to process the data stored in RX FIFO 0 412, a set of data on another data channel may be sent to device 112 and allocated to a different RX FIFO, for example RX FIFO 1 414. Switch control 618 may determine that the newly incoming data has a higher priority than the data being received on channel 1 and allocated to RX FIFO 0 412. If so, device 112 will interrupt the processing of the data on channel 1 and begin processing the newly incoming data. To process the newly incoming data, device 112 advantageously switches contexts a second time, holding a receive (RX) return address in addition to the TX return address.

Switch control 618 may determine priority of incoming data based on information received from link 314 via path 332(*b*) in accordance with a predetermined priority scheme. In one embodiment, switch control 618 may utilize signal speed, packet length, and decryption requirements of incoming data to determine priority. For example, a data packet with a signal speed of 100 megabits per second (Mbps) that requires decryption may be assigned a low priority, while another data packet with a signal speed of 400 Mbps that does not require decryption may be assigned a high priority. Alternatively, switch control 618 may determine priority according to the source of the incoming data. For example, data from a satellite receiver may be assigned a higher priority than data from a camcorder, and the data from the camcorder may be assigned a higher priority than data from an audio system. Other priority schemes are equally within the scope of the present invention, including processing incoming data on a first-come-first-served or round robin basis.

To switch contexts a second time, program counter select 616 outputs the address for the next consecutive receive Ch-1 instruction 646 on path 624. Switch control 618 sends a control signal to return address generator 614 whereby the address for the next receive Ch-1 instruction 646 is held in return address generator 614. The address of the next consecutive receive Ch-1 instruction 646 thus becomes the receive (RX) return address. The functionality of return address generator 614 is further described below in conjunction with FIG. 8.

In response to information from link 314 via path 332(*a*) and a control signal from switch control 618 via path 626, switch address generator 612 outputs the address for the first instruction of the appropriate receive instruction module, for example receive Ch-0 instructions 644. Switch control 618 sends a control signal to program counter select 616 to select the switch address as the output to control store 512, and sends a signal to multiplexer 420 (FIG. 4) via path 422 to select the data in RX FIFO 1 414 to be output to IDP 320. Control store 512 responsively sends the first instruction of receive Ch-0 instructions 644 to CPU 514 for execution. Switch control 618 then sends a control signal to program counter select 616 whereby consecutive addresses of receive Ch-0 instructions 644 are output to control store 512.

When CPU 514 has completed the execution of receive Ch-0 instructions 644, device 112 advantageously resumes receiving data on channel 1. Switch control 618 sends a control signal to return address generator 614 to release the RX return address to program counter select 616 via path 622. Switch control 618 then sends a control signal to program counter select 616 to select the return address as the output to control store 512, and sends a signal to multiplexer 420 via path 422 to select the data in RX FIFO 0 412 to be output to IDP 320. Program counter select 616 outputs the return address to control store 512, which sends the appropriate receive Ch-1 instruction 646 to CPU 514 to resume processing the channel 1 data in RX FIFO 0 412. Switch control 618 next sends a control signal to program counter select 616 so that program counter select 616 outputs consecutive addresses for the remaining receive Ch-1 instructions 646. When CPU 514 has completed the execution of receive Ch-1 instructions, device 112 preferably resumes transmission of data as described above.

Switch control 618 is preferably a state machine that, after receiving a start signal from CPU 514, remains in a transmit mode until a context switch is required, even if data is not currently being transmitted by device 112. When a context switch is required, switch control 618 changes to a receive mode or a cycle start mode and sends the appropriate control signals to switch address generator 612, return address generator 614, and program counter select 616 as described above. When the cycle start or receive operations are complete, switch control 618 then returns to the transmit mode.

Figure 7:
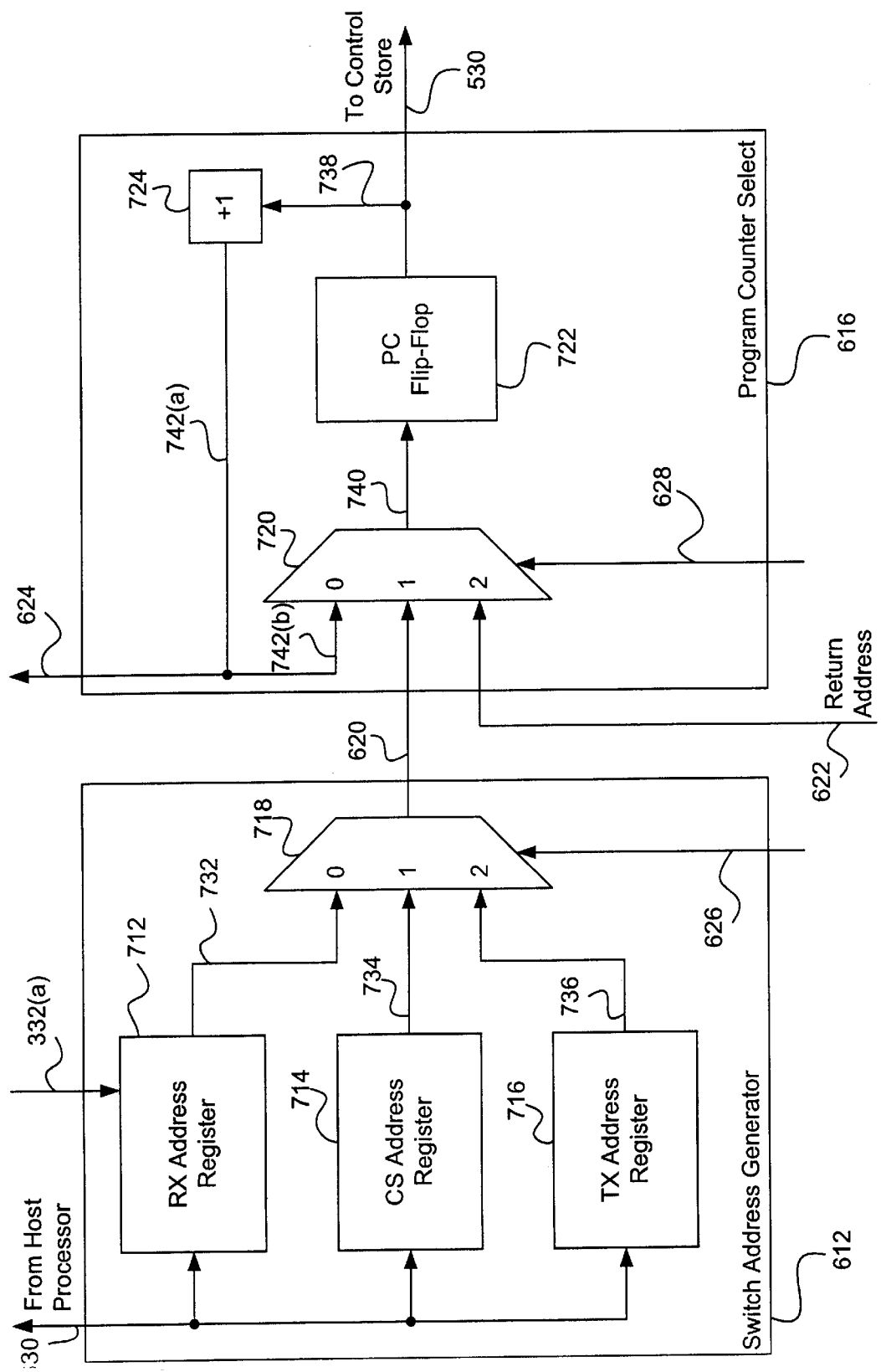
FIG. 7 is a block diagram for one embodiment of the switch address generator and the program counter select of FIG. 6, according to the present invention.

Referring now to FIG. 7, a block diagram for one embodiment of the switch address generator 612 and the program counter select 616 of FIG. 6 is shown, according to the present invention. Switch address generator 612 includes, but is not limited to, a receive (RX) address register 712, a cycle start (CS) address register 714, a transmit (TX) address register 716, and a multiplexer 718.

When host processor 212 (FIG. 2) writes instructions to control store 512, then host processor 212 also writes the address of the first instruction of each instruction module to switch address generator 612 via path 630. The address of the first cycle start instruction 640 is stored in CS address register 714, and the address of the first transmit instruction 642 is stored in TX address register 716. The addresses of the first instruction of each receive instruction module 644 through 648 are stored in RX address register 712. A signal from link 314 to RX address register 712 determines which of the receive instruction addresses is output to multiplexer 718 via path 732. The receive instruction address output to multiplexer 718 preferably corresponds to the channel of the data being received by device 112.

One of the addresses stored in switch address generator 612 is output to program counter select 616 in response to a control signal from switch control 618 via path 626. When input 0 of multiplexer 718 is selected, the first address of the appropriate receive instruction module becomes the switch address and is output to program counter select 616. When input 1 of multiplexer 718 is selected, the address of the first cycle start instruction becomes the switch address and is output to program counter select 616. When input 2 of multiplexer 718 is selected, the address of the first transmit instruction becomes the switch address and is output to program counter select 616.

Program counter select 616 includes, but is not limited to, a multiplexer 720, a program counter (PC) flip-flop 722, and an incrementer 724. Program counter select 616 outputs either the switch address, the return address, or a next consecutive address in response to a control signal from switch control 618 via path 628. When input 1 of multiplexer 720 is selected, the switch address is output to control store 512. When input 2 of multiplexer 720 is selected, the return address is output to control store 512.

When input 0 of multiplexer 720 is selected, a next consecutive address is output to control store 512. The next consecutive address is generated by incrementer 724, which receives the current output of program counter select 616 via path 738 and increments the current output by 1. The next consecutive address is input to multiplexer 720 via path 742(a) and 742(b) and to return address generator 614 via path 742(a) and path 624. Return address generator 614 holds the next consecutive address in response to a control signal from switch control 618 when a transmit or a receive operation is interrupted, as described above in conjunction with FIG. 6. PC flip-flop 722 latches the currently selected address to control store 512.

Figure 8:
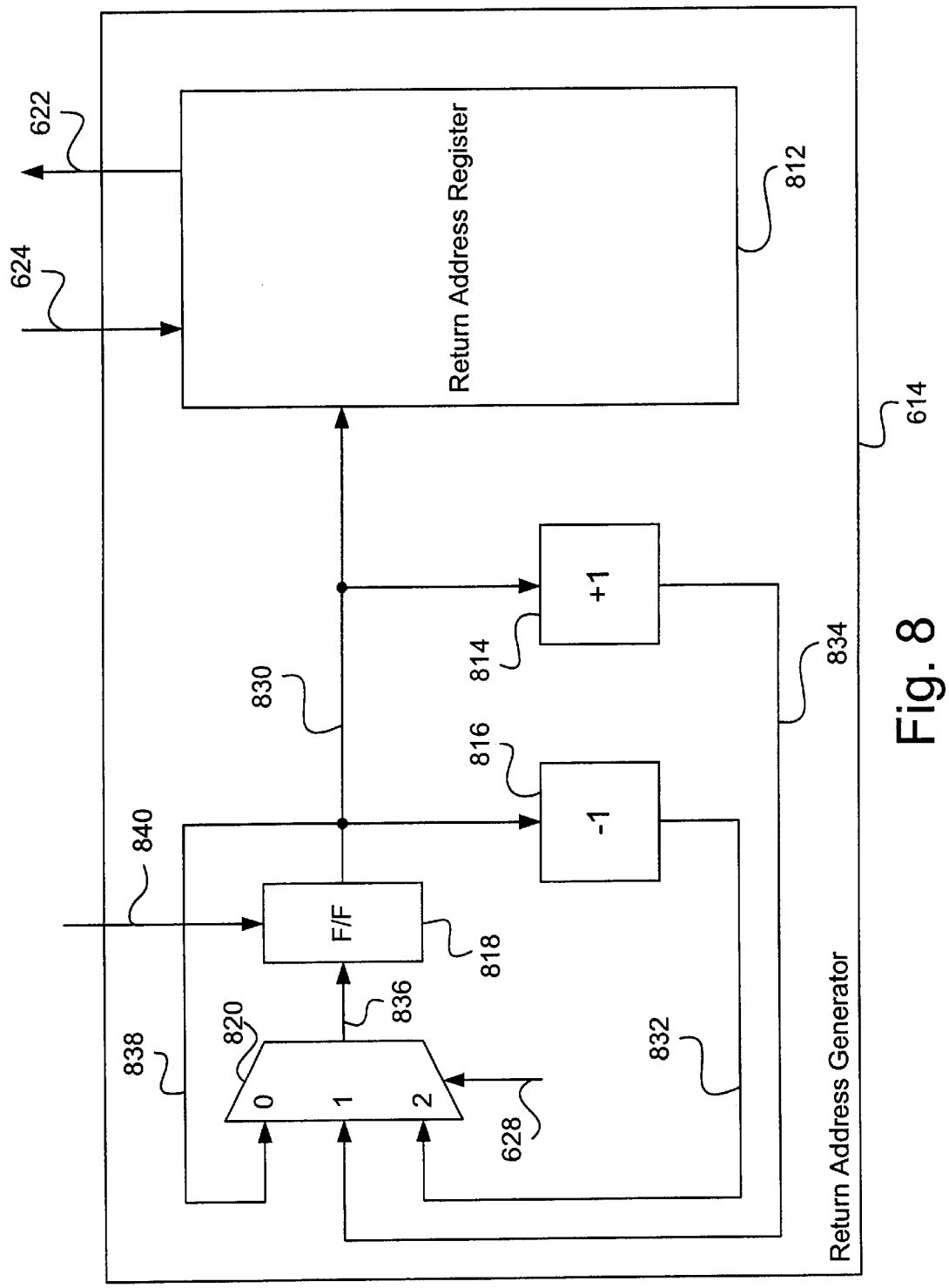
FIG. 8 is a block diagram for one embodiment of the return address generator of FIG. 6, according to the present invention.

Referring now to FIG. 8, a block diagram for one embodiment of the return address generator 614 of FIG. 6 is shown, according to the present invention. Return address generator 614 includes, but is not limited to, a return address register 812, an incrementer 814, a decrementer 816, a flip-flop (F/F) 818, and a multiplexer 820. Flip-flop (F/F) 818 is reset via path 840 upon power up of bus interface 220. Return address register 812 holds and subsequently releases the various return addresses required to resume interrupted operations. Return addresses are input from program counter select 616 via path 624, as described above in conjunction with FIG. 7. Return addresses are output to program counter select 616 via path 622. Return address register 812 is preferably a push-and-pop register, and is further described below in conjunction with FIG. 9.

Multiplexer 820 outputs one of three possible values for a return index on path 830. A select signal from switch control 618 via path 628 determines which input of multiplexer 820 is selected as the return index. The current return index is fed back to input 0 of multiplexer 820 via path 838. Incrementer 814 increases the current return index by one and sends the index plus one to input 1 of multiplexer 820. Decrementer 816 decreases the current return index by one and sends the index minus one to input 2 of multiplexer 820.

The output of multiplexer 820, the current return index, is sent to flip-flop 818 via path 836. Flip-flop 818 latches the current return index to return address register 812 via path 830. When device 112 switches contexts, switch control 618 sends a select signal to multiplexer 820 via path 628 to select the index plus one as the return index. When device 112 resumes the previous context, switch control 618 sends a select signal to multiplexer 820 to select the index minus one as the return index. Thus consecutive return addresses are held in return address register 812, and advantageously released in reverse consecutive order, as shown below in FIG. 9.

Figure 9:
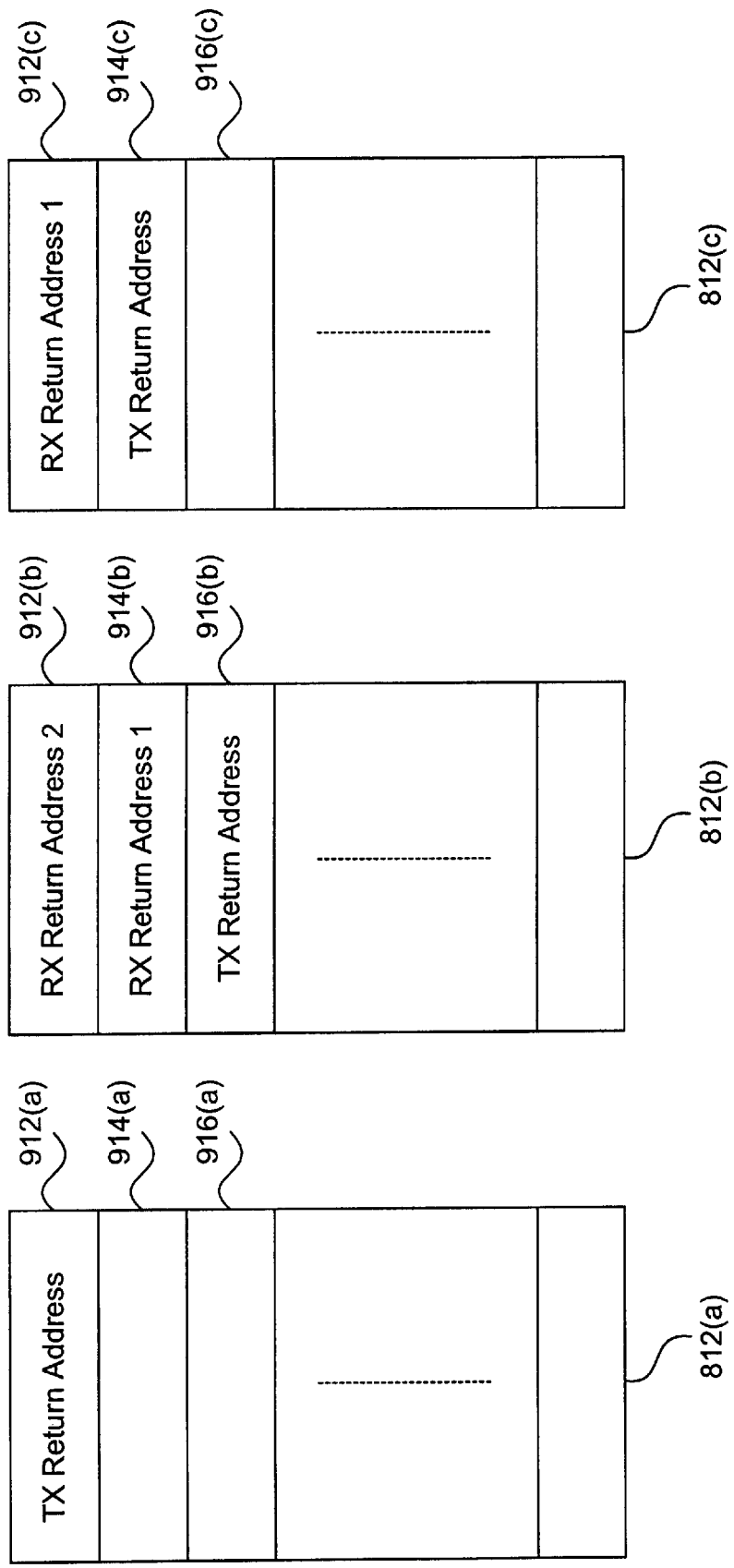
FIG. 9 is a exemplary diagram for one embodiment of the return address register of FIG. 8, according to the present invention.

Referring now to FIG. 9, an exemplary diagram for one embodiment of the return address register 812 of FIG. 8 is shown, according to the present invention. The FIG. 9 embodiment of return address register 812 includes eight address locations; however, a register having any number of address locations is within the scope of the present invention. As described above in conjunction with FIG. 8, return address register 812 holds and releases return addresses for interrupted instruction modules. For example, if device 112 switches contexts from a transmit context to a receive 1 context, a transmit (TX) return address is held in location 912(a) in return address register 812(a).

As described above in conjunction with FIG. 6, device 112 may switch contexts again before resuming the interrupted transmit operation. For example, device 112 may switch contexts to a receive 2 context, and then switch again to a receive 3 context. If so, the TX return address will be pushed down to location 916(b), a receive (RX) return address 1 is pushed down to location 914(b), and a RX return address 2 is held in location 912(b). When device 112 completes the receive 3 operation, the RX return address 2 is released from return address register 812(c) and device 112 resumes the receive 2 operation. The RX return address 1 is now held in location 912(c), and the TX return address is now held in location 914(c).

Figure 10:
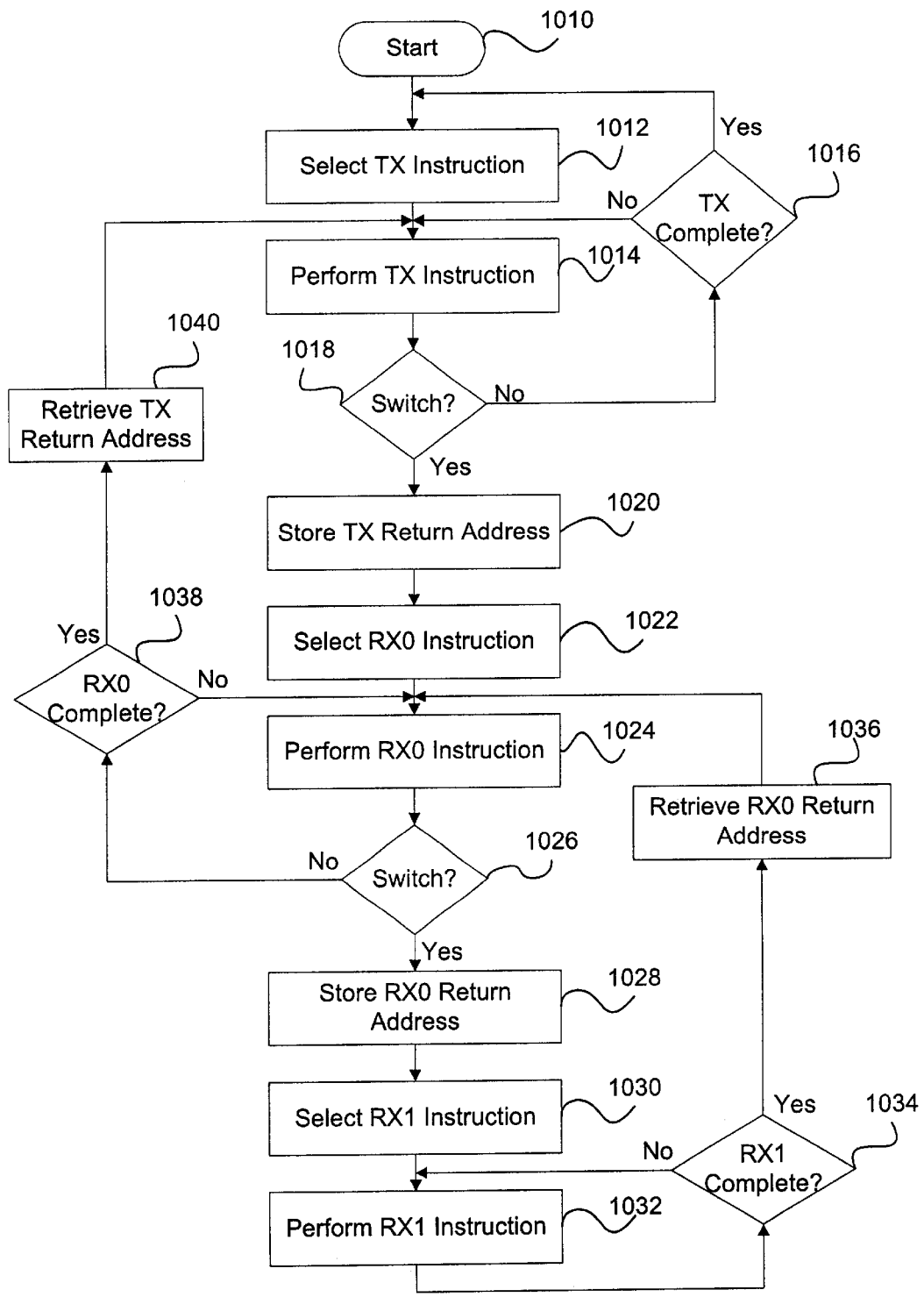
FIG. 10 is a flowchart of method steps for an example of multi-level context switching in an electronic network, according to one embodiment of the present invention.

Referring now to FIG. 10, a flowchart of method steps for multi-level context switching in an electronic network is shown, according to one embodiment of the present invention. The method steps described in conjunction with FIG. 10 are an example of multi-level context switching in which device 112 switches contexts from a transmit context to a receive 0 context, and then switches from the receive 0 context to a receive 1 context. However, the present invention may switch between the various contexts and process the data in the RX FIFOs in RX FIFO bank 318 (FIG. 3) in any order as determined by control state machine 520, and may switch contexts a different number of times than in the FIG. 10 example.

First, in step 1012, control state machine 520 selects the address of the first transmit instruction in control store 512. Then, in step 1014, control store 512 sends the transmit instruction to CPU 514, which performs the selected transmit instruction. After each transmit instruction is performed, control state machine 520 determines, in step 1018, whether a context switch should take place as detected by link 314. If a context switch should not take place, then, in step 1016, control state machine 520 determines whether the transmit operation is complete. If the transmit operation is complete, then the method returns to step 1012. If the transmit operation is not complete, then the method returns to step 1014, where CPU 514 continues to perform the transmit operation.

If, in step 1018, control state machine 520 determines that a context switch should take place, then, in step 1020, control state machine 520 stores the address of the next consecutive transmit instruction, which becomes the TX return address. Next, in step 1022, control state machine 520 selects the address of the first instruction of receive 0 instructions in control store 512 and sends a control signal to FIFO bank 318 to output data stored in RX FIFO 0 412. Then, in step 1024, control store 512 sends the receive 0 instruction to CPU 514, which performs the selected receive 0 instruction.

During performance of each receive 0 instruction, control state machine 520 determines, in step 1026, whether a second context switch should be performed as detected by link 314. If a second context switch should not be performed, then, in step 1038, control state machine 520 determines whether the receive 0 operation is complete. If the receive 0 operation is not complete, the method returns to step 1024, where CPU 514 continues the receive 0 operation.

If the receive 0 operation is complete, then, in step 1040, control state machine 520 releases the transmit return address and sends the transmit return address to CPU 514. Then, in step 1014, CPU 514 resumes the interrupted transmit operation.

If, in step 1026, control state machine 520 determines that a second context switch should be performed, then, in step 1028, control state machine 520 stores the address of the next consecutive receive 0 instruction, which becomes the receive 0 return address. Next, in step 1030, control state machine 520 selects the first receive 1 instruction in control store 512 and sends a control signal to FIFO bank 318 to output data stored in RX FIFO 1 414. In step 1032, control store 512 sends the receive 1 instruction to CPU 514, which performs the selected receive 1 instruction.

During performance of each receive 1 instruction, control state machine 520 determines, in step 1034, whether the receive 1 operation is complete. If the receive 1 operation is not complete, then the method returns to step 1032 to continue the receive 1 operation. If the receive 1 operation is complete, the method continues with step 1036, in which control state machine 520 retrieves the receive 0 return address. The method then returns to step 1024 to complete the interrupted receive 0 operation.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for multi-level context switching in an electronic network, comprising:
   a control state machine configured to implement a data priority scheme for selecting instruction modules, said control state machine being implemented in an isochronous data processor of an interface between a host device and said electronic network;
   a processor configured to selectively process data by executing said instruction modules in accordance with said data priority scheme and context information from said electronic network;
   return addresses for locating interrupted ones of said instruction modules for subsequent execution by said processor; and
   a return address generator coupled to said control state machine, said return address generator being configured to hold and release said return addresses.

2. The system of claim 1, wherein said electronic network is a serial bus network implementing an IEEE 1394 serial bus interconnectivity standard.

3. The system of claim 1, further comprising receive registers that store data from said electronic network, and wherein said control state machine selects said data from one of said receive registers for processing according to said data priority scheme and said context information from said electronic network.

4. The system of claim 1, wherein said data priority scheme includes priority criteria determined by processing requirements of said data from said electronic network.

5. The system of claim 4 wherein said priority criteria include signal speed, length, and decryption requirements of said data from said electronic network.

6. The system of claim 4 wherein said priority criteria include sources of said data from said electronic network.

7. The system of claim 1, further comprising a memory coupled to said control state machine, said memory being configured to store instruction modules for execution by said processor, each of said instruction modules corresponding to a context.

8. The system of claim 7, wherein said control state machine interrupts execution of a first-context instruction module, selects a second-context instruction module for execution, and returns to said first-context instruction module at a corresponding return address upon completion of said second-context instruction module.

9. The system of claim 8, wherein said control state machine interrupts execution of said second-context instruction module, selects a third-context instruction module for execution, and returns to said second-context instruction module at a corresponding second return address upon completion of said third-context instruction module.

10. The system of claim 7, wherein said control state machine interrupts execution of a transmit instruction module, selects a receive instruction module for execution, and returns to said transmit instruction module upon completion of said receive instruction module.

11. The system of claim 7, wherein said control state machine interrupts execution of a receive instruction module for processing a first set of data, selects a second receive instruction module for execution to process a second set of data having a higher priority than said first set of data, and returns to said receive instruction module upon completion of said second receive instruction module.

12. The system of claim 7, wherein said control state machine includes a switch address generator that generates a switch address corresponding to a first instruction of one of said instruction modules in response to said context information.

13. The system of claim 12, wherein said control state machine further includes a program counter select that selects one of a group consisting of said switch address, a released return address, and a next consecutive address.

14. The system of claim 13, wherein said switch address generator outputs a receive address for a first receive instruction of a first receive instruction module to said program counter select, and said program counter select outputs said receive address to said memory and then outputs next consecutive receive addresses to said memory to select next consecutive receive instructions in said first receive instruction module to process a data packet.

15. The system of claim 14 wherein said program counter select outputs a next consecutive receive address to said return address generator in response to context information from said electronic network, and said return address generator holds said next consecutive receive address as a return receive address when processing of said data packet is interrupted to process a high-priority data packet.

16. The system of claim 15, wherein said switch address generator outputs a second receive address for a first receive instruction of a second receive instruction module to said program counter select in response to context information from said electronic network, and said program counter select outputs said second receive address to said memory to select said first receive instruction of said second receive instruction module to process said high-priority data packet.

17. The system of claim 16, wherein said return address generator outputs said return receive address to said program counter select, and said program counter select outputs said return receive address to said memory to select a return receive instruction to continue processing said data packet upon completion of processing said high-priority data packet.

18. The system of claim 12, wherein said switch address generator includes a transmit address register, a receive address register, and a cycle start address register.

19. The system of claim 18, wherein said transmit address register stores a first instruction for a transmit instruction module stored in said memory, said receive address register stores first instructions for receive instruction modules stored in said memory, each receive instruction module corresponding to a unique data channel, and wherein said cycle start address register stores a first instruction for a cycle start instruction module stored in said memory.

20. The system of claim 1, wherein said control state machine remains in a transmit mode when said host device transmits data and when said host device does not transmit data unless said control state machine changes to a second-context mode to perform a second-context operation, and wherein said control state machine returns to said transmit mode upon completion of said second-context operation.

21. The system of claim 1, wherein said context information from said electronic network is contained in header information of corresponding data packets to indicate processing requirements of said corresponding data packets.

22. The system of claim 1, wherein said host device is a consumer electronic device.

23. The system of claim 22, wherein said consumer electronic device is a digital video recording and playback device.

24. A method for multi-level context switching in an electronic network, comprising the steps of:
   implementing a data priority scheme for selecting instruction modules by utilizing a control state machine in an isochronous data processor of an interface between a host device and said electronic network;
   processing data selectively with a processor that executes said instruction modules in accordance with said priority scheme and context information from said electronic network;
   storing return addresses for interrupted ones of said instruction modules using a return address generator; and
   locating said interrupted ones of said instruction modules for a subsequent execution by using said return addresses from said return address.

25. The method of claim 24, wherein said electronic network is a serial bus network implementing an IEEE 1394 serial bus interconnectivity standard.

26. The method of claim 24, further comprising the step of storing data from said electronic network in receive registers, and wherein said control state machine selects said data from one of said receive registers for processing according to said data priority scheme and said context information from said electronic network.

27. The method of claim 24, wherein said data priority scheme includes priority criteria determined by processing requirements of said data from said electronic network.

28. The method of claim 27, wherein said priority criteria include signal speed, length, and decryption requirements of said data from said electronic network.

29. The method of claim 27, wherein said priority criteria include sources of said data from said electronic network.

30. The method of claim 24, further comprising the step of storing instruction modules for execution by said processor in a memory coupled to said control state machine, each of said instruction modules corresponding to a context.

31. The method of claim 30, wherein said control state machine interrupts execution of a first-context instruction module, selects a second-context instruction module for execution, and returns to said first-context instruction module at a corresponding return address upon completion of said second-context instruction module.

32. The method of claim 31, wherein said control state machine interrupts execution of said second-context instruction module, selects a third-context instruction module for execution, and returns to said second-context instruction module at a corresponding second return address upon completion of said third-context instruction module.

33. The method of claim 30, wherein said control state machine interrupts execution of a transmit instruction module, selects a receive instruction module for execution, and returns to said transmit instruction module upon completion of said receive instruction module.

34. The method of claim 30, wherein said control state machine interrupts execution of a receive instruction module for processing a first set of data, selects a second receive instruction module for execution to process a second set of data having a higher priority than said first set of data, and returns to said receive instruction module upon completion of said second receive instruction module.

35. The method of claim 30, wherein said control state machine includes a switch address generator that generates a switch address corresponding to a first instruction of one of said instruction modules in response to said context information.

36. The method of claim 35, wherein said control state machine further includes a program counter select that selects one of a group consisting of said switch address, a released return address, and a next consecutive address.

37. The method of claim 36, wherein said switch address generator includes a transmit address register, a receive address register, and a cycle start address register.

38. The method of claim 37, wherein said transmit address register stores a first instruction for a transmit instruction module stored in said memory, said receive address register stores first instructions for receive instruction modules stored in said memory, each receive instruction module corresponding to a unique data channel, and wherein said cycle start address register stores a first instruction for a cycle start instruction module stored in said memory.

39. The method of claim 36, wherein said switch address generator outputs a receive address for a first receive instruction of a first receive instruction module to said program counter select, and said program counter select outputs said receive address to said memory and then outputs next consecutive receive addresses to said memory to select next consecutive receive instructions in said first receive instruction module to process a data packet.

40. The method of claim 39, wherein said program counter select outputs a next consecutive receive address to said return address generator in response to context information from said electronic network, and said return address generator holds said next consecutive receive address as a return receive address when processing of said data packet is interrupted to process a high-priority data packet.

41. The method of claim 40, wherein said switch address generator outputs a second receive address for a first receive instruction of a second receive instruction module to said program counter select in response to context information from said electronic network, and said program counter select outputs said second receive address to said memory to select said first receive instruction of said second receive instruction module to process said high-priority data packet.

42. The method of claim 41, wherein said return address generator outputs said return receive address to said program counter select, and said program counter select outputs said return receive address to said memory to select a return receive instruction to continue processing said data packet upon completion of processing said high-priority data packet.

43. The method of claim 24, wherein said control state machine remains in a transmit mode when said host device transmits data and when said host device does not transmit data unless said control state machine changes to a second-context mode to perform a second-context operation, and wherein said control state machine returns to said transmit mode upon completion of said second-context operation.

44. The method of claim 24, wherein said context information from said electronic network is contained in header information of corresponding data packets to indicate processing requirements of said corresponding data packets.

45. The method of claim 24, wherein said host device is a consumer electronic device.

46. The method of claim 45, wherein said consumer electronic device is a digital video recording and playback device.

47. A network interface between a host device and an electronic network, comprising:
- a memory configured to store instruction modules, each corresponding to a context;
- registers configured to store data from said electronic network;
- a control state machine coupled to said memory, said control state machine configured to select one of said instruction modules in accordance with a priority scheme and context information from said electronic network, and further configured to select data in one of said registers in accordance with said priority scheme and said context information;
- a return address generator coupled to said control state machine, said return address generator configured to hold and release return addresses for interrupted instruction modules in accordance with said priority scheme; and
- a processor coupled to said memory for executing said instruction modules to process said data stored in said registers.

48. A computer-readable medium comprising program instructions for multi-level context switching in an electronic network, by performing the steps of:
- implementing a data priority scheme for selecting instruction modules by utilizing a control state machine in an isochronous data processor of an interface between a host device and said electronic network;
- processing data selectively with a processor that executes said instruction modules in accordance with said priority scheme and context information from said electronic network;
- storing return addresses for interrupted ones of said instruction modules using a return address generator; and
- locating said interrupted ones of said instruction modules for a subsequent execution by using said return addresses from said return address generator.

49. A system for multi-level context switching in an electronic network, comprising:
- means for implementing a data priority scheme for selecting instruction modules with an isochronous data processor of an interface between a host device and said electronic network;
- means for processing data selectively by executing said instruction modules in accordance with said priority scheme and context information from said electronic network;
- means for storing return addresses for interrupted ones of said instruction modules; and
- means for locating said interrupted ones of said instruction modules for a subsequent execution by using said return addresses from said means for storing.

* * * * *